June 23, 1959  F. S. PEARNE  2,891,764
JACK STRUCTURE SUPPORTED BY SPRING MOUNTED WHEELS
Filed July 13, 1956  3 Sheets-Sheet 1
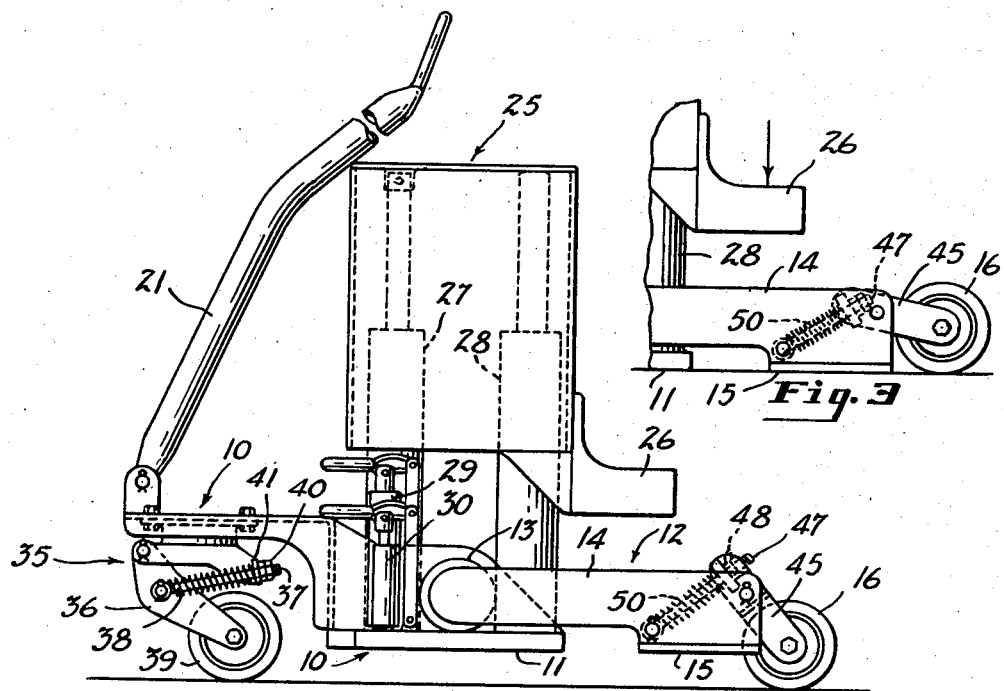
INVENTOR
Frank S. Pearne
BY Ely, Pearne & Gordon
ATTORNEYS June 23, 1959  F. S. PEARNE  2,891,764
JACK STRUCTURE SUPPORTED BY SPRING MOUNTED WHEELS
Filed July 13, 1956  3 Sheets-Sheet 2

INVENTOR
Frank S. Pearne
BY Ely, Pearne & Gordon
ATTORNEYS

INVENTOR
*Frank S. Pearne*
BY *Ely, Pearne & Gordon*
ATTORNEYS ed June 23, 1959

2,891,764

JACK STRUCTURE SUPPORTED BY SPRING MOUNTED WHEELS

Frank S. Pearne, Alhambra, Calif.

Application July 13, 1956, Serial No. 597,630

9 Claims. (Cl. 254—1)

This invention relates to lifting jacks and more particularly to lifting jacks of relatively heavy structure which are provided with wheels or casters for ready transport and for ready positioning under the load to be lifted. Such jacks are widely used to lift heavy aircraft incident to line maintenance and repair operations where cranes or other large and heavy lifting devices are unavailable or impractical. Mechanisms of the type to which the invention relates are most commonly used in changing wheels or tires of aircraft landing gears and in checking brakes and performing other similar maintenance and servicing operations. To this end most heavy aircraft are provided with jack pads immediately below the main supporting strut or struts of the landing gear. These pads are adapted to be lifted by suitable jacks to support the weight normally supported by the wheel or wheels of the landing gear so that the wheels may be relieved of all weight and may be rotated and disassembled.

Jacks of the type to which the invention relates are provided with a base and with wheels or casters which are moveable relative to the base and which are spring mounted with respect to the base, the elements being so combined and arranged that the wheels or casters normally support the base in spaced relation over the ground, thus providing for the easy transportation or manipulation of the jack while placing the same beneath the load to be lifted (for example, beneath the jack pad of an aircraft landing gear) or while removing the jack from the operating location. When the load to be supported is brought to bear on the jack, the base is moved downwardly into direct engagement with the ground, the spring-mounted wheels being forced upwardly. The wheels or casters are automatically restored to extended position when the load is relieved from the jack.

It will be understood that when a structure of the type described is in load-supporting position with its base or pad in load-supporting engagement with the ground, the wheels or casters are held in retracted position by virtue of the fact that the heavy load which is imposed on the jack overcomes the springs which normally urge the wheels or casters to extended position. Accordingly, when the jack is in load-supporting position the wheels or casters continue to exert a considerable force on the ground. This pressure may be continuously imposed for a great length of time and in many cases, particularly where the jack is used on soft surfaces such as asphalt or blacktop, the wheels or casters sink into the surface. This tendency is particularly apparent in warm weather and is the source of considerable trouble and inconvenience.

An object of the present invention is to provide a jack of the type described which overcomes this difficulty of the prior art by extremely simple and economical means. The invention contemplates embodying toggle linkages in the wheel or caster mountings in such a manner that the vertical component of force acting on the spring-loaded wheel or caster is increased by a relatively small amount or is actually decreased or eliminated when the wheel or caster is urged to retracted position by the overbearing load imposed on the jack.

Another object of the invention is the provision of a jack with a caster wheel which makes possible the above advantages and which at the same time can be readily swiveled without disturbing the positioning of the jack so that the jack may be moved from side to side with no appreciable longitudinal shifting and may be moved longitudinally without transverse shifting. These and other objects and advantages of the invention will become more fully apparent from the following description of embodiments of the invention. These descriptions are made merely by way of example and refer to the accompanying drawings in which:

Figure 1 is a side elevation of a jack employing the present invention.

Figure 2 is a plan view of the jack shown in Figure 1.

Figure 3 is a view of the right portion of Figure 1, the parts being shown in a different position.

Figure 4:
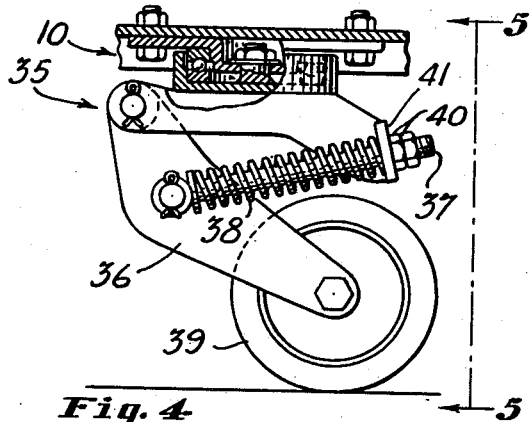
Figure 4 is a detail view of the structure shown in the lower left portion of Figure 1.

The jack structure shown in Figures 1 and 2 comprises a base generally indicated at 10, the bottom of which is formed as a base pad having a substantially smooth lowermost surface 11. The jack base is provided with widely spaced outriggers 12 which are pivotally fixed to the center base by a rigid torque tube 13 and arms 14. Each outrigger is preferably provided with an outrigger pad or pads 15. Wheels 16 are mounted on the outriggers and the rear center portion of the base (the leftmost portion, as shown in Figure 1) by means of pivoting links and are urged to extended position by spring means. Sufficient downward force on the base 10 forces the wheels 16 to retract against the tension of the spring means and allows the pads 11 and 15 to contact the deck or other foundation on which the jack is placed. A pivot handle 21 is provided for conveniently moving and placing the jack.

For the purposes of the present invention, it should be clear that the provision of a plurality of lowermost pads, such as the pads 11 and 15 is equivalent to the provision of a single pad. That is, for purposes of the appended claims, the pads 11 and 15 may be collectively regarded as the lowermost ground-engaging surface of the jack base.

The jack itself may comprise an upper platen 25 which is provided with a lifting foot 26 adapted to engage the lifting pad provided on an aircraft landing gear or other object to be lifted. The upper platen 25 is raised by the action of the hydraulic cylinders 27 and 28 which are controlled by the pumps 29 and 30 and the valves 31 and 32, the details and mode of operation of this hydraulic lifting mechanism being not here material. It will be apparent that the subject matter of the present invention may be used in connection with jacks in which other types of lifting mechanisms are provided.

Figure 5:
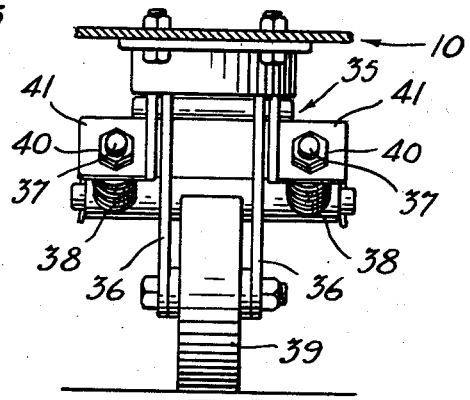
Figure 5 is a view taken from line 5—5 in Figure 4.

The structure shown in the lower left portion of Figure 1 is illustrated in greater detail in Figures 4 and 5. A swiveling carriage is provided which is generally indicated at 35. Associated with the carriage 35 is a toggle linkage comprising a pair of links 36 between the lower ends of which is mounted a caster wheel 39. The toggle linkage also comprises the links 37 which at their free ends are provided with stop nuts 40. The links 37 pass through stop plates 41 which are fastened to the bottom of the carriage 35. Each link 37 is provided with a surrounding compression spring 38 which tends to lower the wheel 39 by forcing the links 36 to pivot away from the stop plates 41. The body of the carriage 35 is swively mounted on the underside of the leftmost portion of the base 10, as shown. It will be understood that the described linkage comprises a toggle linkage which approaches dead center as the caster wheel 39 is forced upwardly towards the level of the pads 11 and 15. The toggle linkage illustrated approaches but does not reach dead center. It will be apparent, however, that the linkage can be slightly modified to cause it to pass dead center as the level of the pads 11 and 15 is approached or lifted. This may be desirable in certain instances although it would require that the caster be manually forced back over dead center position or that supplementary means be provided to perform this function when it is desired to lower the rollers upon relieving the overbearing load from the lifting foot 26.

In the illustrated embodiment, the toggle linkage does not pass over dead center but, nevertheless, as the ground engaging point on the periphery of the wheel 39 approaches the level of the jack pads so that both the pads and the wheel engage the ground, the line of action of the spring 38 relative to the link 36 changes so as to decrease the effective lever arm of the spring in opposing wheel-retracting movement of the link. Simultaneously, in this particular form of the invention, the line of action of wheel-load forces relative to the link 36 changes so as to increase the effective lever arm of the wheel-load forces in causing wheel-retracting movement of the link. Both of these lever arm changes are such as to reduce the mechanical advantage of the spring 36 in opposing wheel-load forces. Ideally, as shown, both of these changes tending to reduce the mechanical advantage of the spring in opposing wheel-load forces occur, not only simultaneously, but progressively throughout movement of the wheel from a normal depending position to a wheel retracted position in which the pads are also in engagement with the ground. In any event, so long as the net effect of these changes between a normal wheel-depending position and said wheel retracted position is a decrease in the mechanical advantage of the spring in opposing wheel-load forces, it will be apparent that this net effect is such as to minimize the downward force of the wheel on the ground when in said retracted position. In the event the toggle linkage is proportioned to pass over dead center, the downward force is eliminated altogether.

In the foregoing discussion, and as used elsewhere in this specification and the appended claims, the expression "effective lever arm" of a force or of a force exerting means, relative to an axis about which it acts, is used in its normal sense to mean the distance from such axis to the line of action of the force or force exerting means as measured perpendicularly to such line of action.

Figure 6:
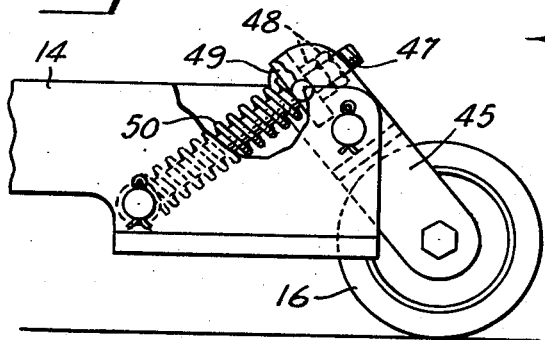
Figure 6 is a detail view of the structure shown in the lower right hand portion of Figure 1.
Figure 7:
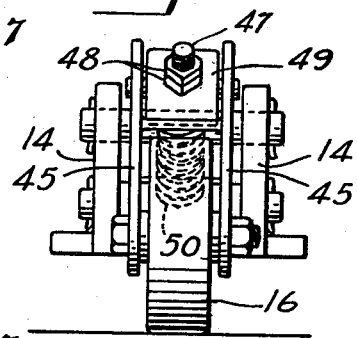
Figure 7 is a detail view taken on line 7—7 in Figure 6.
Figure 9:
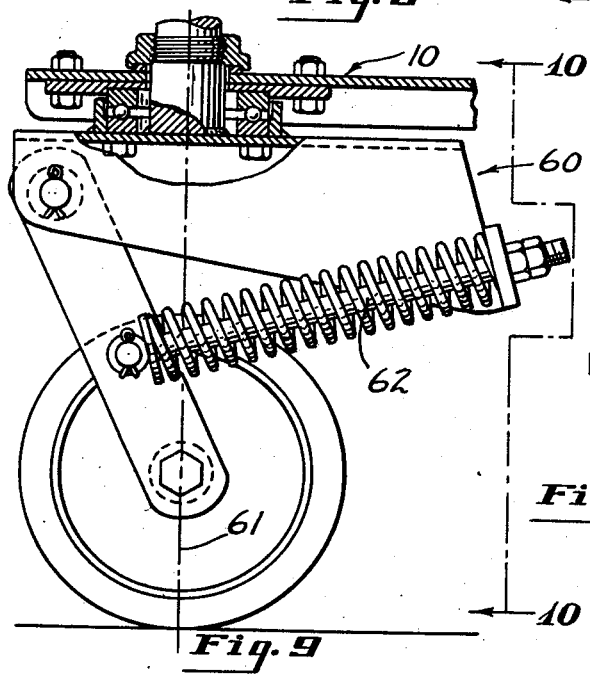
Figure 9 is a detail view of the structure shown in the lower left hand portion of Figure 8.
Figure 10:
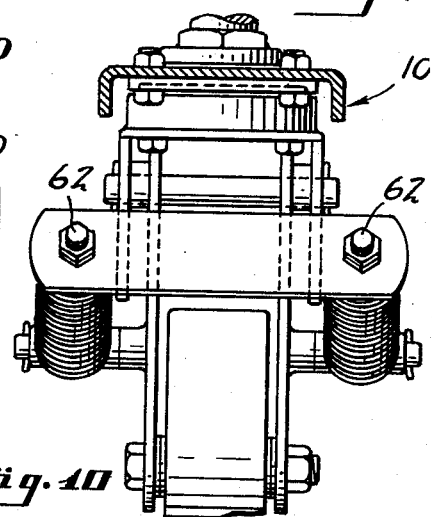
Figure 10 is a view taken from line 10—10 in Figure 9.

The structure shown in the lower right portion of Figure 1 is illustrated in greater detail in Figures 6 and 7. As shown in these figures, there is provided a toggle linkage comprising a pair of links 45 between the lower ends of which is mounted one of the wheels 16. The links 45 are pivoted at an intermediate point to the ends of the outrigger arms 14. Also pivoted to the ends of each outrigger arm 14 is a link 47. Each link 47 is provided with stop nuts 48 and passes in sliding engagement through a stop plate 49 which is pivoted between the links 45 at their upper ends. A compression spring 50 surrounds each link 47 and tends to raise the upper ends of the links 45 and correspondingly to lower the wheels 16. Thus, it will be seen that there is a toggle linkage provided which, in the illustrated embodiment, does not reach dead center; but in any case, according to the invention, it approaches dead center as the wheel 16 is raised from its lowermost extended position. The downward force which is exerted by the wheels 16 when they are in their retracted position is thereby greatly minimized. It may also be eliminated altogether in this embodiment of the invention if the toggle linkage is proportioned to pass dead center, as is alternatively contemplated by the invention.

Figure 8:
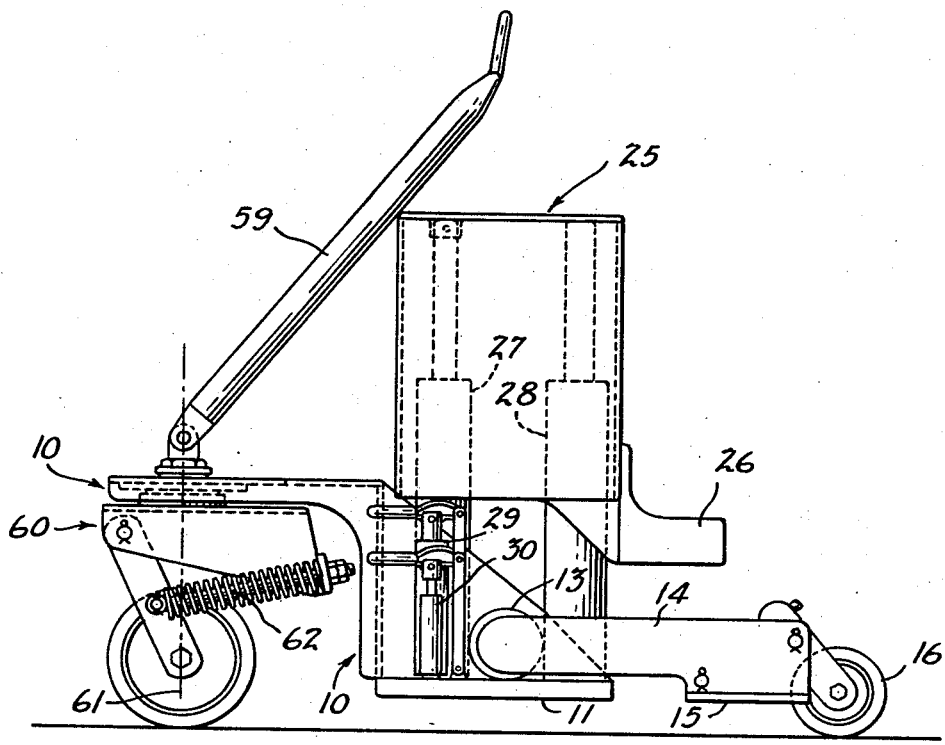
Figure 8 is an elevation of another jack in which the present invention is employed.

Figure 8 illustrates another jack structure in which the invention is employed. This jack structure is generally similar to the structure shown in Figures 1 and 2 and like elements in the respective figures bear the same reference numerals. In the jack shown in Figure 8 the pivoted handle 21 of Figures 1 and 2 is replaced by a tiller 59. The carriage 35 of Figures 1 and 2 is replaced by a carriage generally indicated at 60. The carriage 60 is swively mounted on the underside of the leftmost portion of the base 10 and is connected to the tiller 59, as shown. The toggle linkage and wheel structure associated with the carriage 60 is similar in general organization to that associated with the carriage 35. However, the vertical axis 61 about which the carriage 60 swivels and the dimensions of the toggle linkage associated with the carriage 60 are so related that the stops associated with the links 62 (which are the counterparts of the links 37) limit the downward movement of the caster wheel so that at its lowermost position the axis of the caster wheel intersects the vertical axis 61. When the jack with which this structure is associated is under load and the wheel is retracted, the downward pressure of the wheel is minimized (or may be eliminated by having the toggle pass over center) in the manner earlier described in accordance with the previously disclosed embodiments of the invention. However, when the wheel is fully extended at times when the jack structure is not under load, the tiller 59 may be readily manipulated to enable the jack to be moved back and forth without any sidewise movement or to be moved from side to side at its leftmost end (as shown in Figure 8) without any appreciable longitudinal movement of the jack. The jack may, therefore, be very readily and conveniently positioned and manipulated into and out of position beneath the aircraft landing gear jack pad or other elements which it is to contact in lifting engagement. It may also be more conveniently stored in locations where there is relatively restricted floor space.

It should be evident that the precise details of the invention that I have disclosed above are not all critical to the practice of the invention. The scope of the invention is not limited to the combination of all of the illustrated details but is defined by the following claims.

What is claimed is:

1. A portable load supporting device comprising a base adapted to receive and support a load, said base including at least one flat, lowermost, bottom surface providing a load bearing pad, a plurality of wheels retractably associated with said base for holding said pad raised from a flat supporting surface when said base is unloaded, and a corresponding plurality of wheel suspension mechanisms respectively connecting said wheels to said base for movement relative thereto between normal depending base supporting positions wherein the wheel peripheries extend below the level of said pad to wheel retracted positions at which said pad and wheel peripheries are both in engagement with a flat supporting surface, each of said wheel suspension mechanisms comprising a link pivotally connected to said base for swinging about a first horizontal axis and carrying one of said wheels for rotation on the link about a horizontal wheel axis spaced along the link from said first axis, and spring means acting between said link and said base for yieldably resisting pivotal movement of the link in a wheel retracting direction, said spring means being connected to said link for pivotal movement relative thereto as the link pivots relative to the base to provide a variable effective lever arm of the spring means about said first axis, and said spring means being oriented relative to the link to provide a substantially greater effective lever arm of the spring means when the wheel is in said depending position than when the wheel is in said retracted position, so as to give the spring means a greater mechanical advantage, in resisting pivotal movement of the link in a wheel retracting direction when the wheel is in said depending position than when the wheel is in said retracted position.

2. A portable load supporting device according to claim 1 in which said spring means is oriented relative to said link to provide a continuously decreasing effective lever arm of the spring means as the wheel moves from said normal depending position to said retracted position.

3. A portable load supporting device according to claim 1 in which at least one of said wheels is mounted for steering rotation relative to said base about a normally vertical axis, said device including towing and steering means operatively connected to said base to extend therefrom for steering the device.

4. A portable load supporting device according to claim 1 in which one of said suspension mechanisms is mounted for steering rotation relative to said base about a normally vertical axis and includes stop means disposed to limit movement of its wheel in a wheel depending direction at a predetermined depending position at which said horizontal wheel axis intersects said vertical axis, and towing and steering means connected thereto for rotating the same about said vertical axis relative to the base.

5. A portable load supporting device according to claim 1 in which at least one of said wheels is mounted for steering rotation relative to said base about a normally vertical axis, said device including towing and steering means extending from said base, and means connecting the towing and steering means to said base for swinging movement about a horizontal axis fixed relative to said base while restraining swinging movement of the towing and steering means in horizontal directions relative to the base.

6. A portable load supporting device comprising a base adapted to receive and support a load, said base including at least one flat lowermost bottom surface providing a load-bearing pad, a plurality of wheels retractably associated with said base for holding said pad raised from a flat supporting surface when said base is unloaded, and a corresponding plurality of wheel suspension mechanisms respectively connecting said wheels to said base for movement relative thereto between normal depending base supporting positions wherein the wheel peripheries extend below the level of said pad to wheel retracted positions at which said pad and wheel peripheries are both in engagement with a flat supporting surface, each of said wheel suspension mechanisms comprising a link pivotally connected to said base for swinging about a first horizontal axis and carrying one of said wheels for rotation on the link about a horizontal wheel axis spaced along the link from said first axis, and spring means acting between said link and said base for yieldably resisting pivotal movement of the link in a wheel retracting direction, said spring means being mounted for pivotal movement relative to the link as the link pivots relative to the base, whereby the effective lever arm of wheel-load forces acting to cause wheel retracting movement of the link about said first axis and the effective lever arm of the spring means in opposing such movement both vary with such movement, the link being oriented relative to the base and the spring means being oriented relative to the link to provide a substantially smaller effective lever arm of said wheel load forces and a substantially greater effective lever arm of said spring means when the wheel is in said normal depending position than when the wheel is in said retracted position so that the mechanical advantage of the spring means in opposing wheel-load forces is reduced by movement of the wheel from said normal depending position to said retracted position.

7. A portable load supporting device comprising a base adapted to receive and support a load, said base including at least one flat lowermost bottom surface providing a load-bearing pad, a plurality of wheels retractably associated with said base for holding said pad raised from a flat supporting surface when said base is unloaded, and a corresponding plurality of wheel suspension mechanisms respectively connecting said wheels to said base for movement relative thereto between normal depending base supporting positions wherein the wheel peripheries extend below the level of said pad to wheel retracted positions at which said pad and wheel peripheries are both in engagement with a flat supporting surface, each of said wheel suspension mechanisms comprising a link pivotally connected to said base for swinging about a first horizontal axis and carrying one of said wheels for rotation on the link about a horizontal wheel axis spaced along the link from said first axis, and spring means acting between said link and said base for yieldably resisting pivotal movement of the link in a wheel retracting direction, said spring means being mounted for pivotal movement relative to the link as the link pivots relative to the base, whereby the effective lever arm of wheel-load forces acting to cause wheel retracting movement of the link about said first axis and the effective lever arm of the spring means in opposing such movement both vary with such movement, the link being oriented relative to the base and the spring means being oriented relative to the link to provide a continuously increasing effective lever arm of the wheel load forces and a continuously decreasing effective lever arm of the spring means as the wheel moves from said normal depending position to said retracted position so that the mechanical advantage of the spring means in opposing wheel-load forces progressively decreases substantially throughout retraction of the wheel from said normal depending position to said retracted position.

8. In lifting jack structure, the combination of a jack base including a flat lowermost bottom surface comprising a load-bearing pad, a plurality of wheels associated with said base and a plurality of corresponding spring-loaded mountings for connecting said wheels to said base, a carriage on the underside of said base and mounted for pivoting movement with respect to said base around a vertical axis, a tiller for manipulating said base, one of said wheels being mounted to said carriage for pivoting movement with respect to said base together with said carriage, the spring-loaded mounting for said one wheel comprising means to mount said wheel for pivoting movement with resptct to said carriage and said base between a depending position substantially below the level of said pad and a retracted position other than substantially below the level of said pad, said last mentioned pivotal movement of said one wheel being about a horizontal axis and along a path intersecting said vertical axis, said spring loaded mounting also comprising a spring urging said wheel to said depending position and a stop defining said depending position, the axis of said wheel intersecting said vertical axis when said wheel is in said depending position.

9. In lifting jack structure, the combination of a jack base including a flat lowermost bottom surface comprising a load-bearing pad, a plurality of wheels associated with said base and a plurality of corresponding spring-loaded toggle linkages for connecting said wheels to said base, each wheel being mounted on its associated toggle linkage for movement about a horizontal axis along an arcuate path between a depending position substantially below the level of said pad and a retracted position other than substantially below the level of said pad, said spring loaded toggle linkages urging said wheels to said depending positions, a carriage on the underside of said base and mounted for pivoting movement with respect to said base around a vertical axis, a tiller for manipulating said base, said tiller being operatively coupled to said carriage for rotating the same about said vertical axis relative to said base, one of said wheels and its associated toggle linkage being mounted to said carriage for pivoting movement with respect to said base together with said carriage and being disposed on the carriage so that said arcuate path of said one wheel intersects said vertical axis, said last named toggle linkage including stop means to define the depending position of said one wheel at a level where the axis of said one wheel intersects said vertical axis.

References Cited in the file of this patent

UNITED STATES PATENTS

| | | |
|---|---|---|
| 1,400,931 | Barker | Dec. 20, 1921 |
| 1,477,790 | Townsend | Dec. 18, 1923 |
| 2,271,304 | Mulholland | Jan. 27, 1942 |
| 2,632,655 | King et al. | Mar. 24, 1953 |